(12) United States Patent
Liu et al.

(10) Patent No.: US 8,384,857 B2
(45) Date of Patent: Feb. 26, 2013

(54) COLOR FILTER SUBSTRATE WITH PART OF SPACER DISPOSED ABOVE COLOR FILTER PATTERN PROTRUSION AND LIQUID CRYSTAL DISPLAY PANEL

(75) Inventors: Yui-Chen Liu, Taipei (TW);
Hsien-Ching Chiu, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 470 days.

(21) Appl. No.: 12/690,095

(22) Filed: Jan. 19, 2010

(65) Prior Publication Data
US 2011/0128480 A1  Jun. 2, 2011

(30) Foreign Application Priority Data
Nov. 30, 2009  (TW) .............................. 98222414 U

(51) Int. Cl.
*G02F 1/1335* (2006.01)
*G02F 1/1333* (2006.01)
*G02F 1/1339* (2006.01)

(52) U.S. Cl. .................. 349/106; 349/110; 349/155
(58) Field of Classification Search .................. 349/106, 349/110, 155
See application file for complete search history.

(56) References Cited

U.S. PATENT DOCUMENTS

| 7,248,328 B1* | 7/2007 | Shibahara | 349/155 |
| 2005/0151909 A1* | 7/2005 | Yagi et al. | 349/138 |
| 2006/0028598 A1* | 2/2006 | Lee et al. | 349/107 |
| 2009/0161046 A1* | 6/2009 | Tokuda et al. | 349/106 |

* cited by examiner

*Primary Examiner* — Michael Caley
(74) *Attorney, Agent, or Firm* — Jianq Chyun IP Office

(57) ABSTRACT

A color filter substrate disposed with a spacer is provided. The color filter substrate includes a light shielding layer and a plurality of striped color filter pattern. The light shielding layer is disposed on a substrate and defines a plurality of sub pixel regions and a plurality of light shield regions. The striped color filter patterns partially cover the light shielding regions and the sub pixel regions. Each striped color filter pattern includes a protrusion portion extending to the light shielding regions, and part of the spacer is disposed above the protrusion portion.

14 Claims, 7 Drawing Sheets

COLOR FILTER SUBSTRATE WITH PART OF SPACER DISPOSED ABOVE COLOR FILTER PATTERN PROTRUSION AND LIQUID CRYSTAL DISPLAY PANEL

CROSS-REFERENCE TO RELATED APPLICATION

This application claims the priority benefit of Taiwan application serial no. 98222414, filed on Nov. 30, 2009. The entirety of the above-mentioned patent application is hereby incorporated by reference herein and made a part of specification.

BACKGROUND OF THE INVENTION

1. Field of Invention

The invention relates to a color filter substrate and a liquid crystal display (LCD) panel, and more particularly to a color filter substrate and an LCD panel that have high resolution.

2. Description of Related Art

The conventional liquid crystal display (LCD) panel is constituted by a color filter substrate, a thin-film transistor array substrate, and a liquid crystal layer disposed between the foregoing two substrates. Generally, a design rule must be followed when disposing the relative positions of a light shielding layer, color filter patterns, spacers, and so on in the color filter substrate. The design of the color filter patterns and the spacers usually adopts the three methods shown in FIGS. 1-3 illustrated below.

FIG. 1 is a schematic top view of a conventional color filter substrate. Referring to FIG. 1, a color filter substrate 100 includes a light shielding layer 110 and a plurality of color filter patterns 120. The light shielding layer 110 defines a plurality of light shielding regions BM and a plurality of sub pixel regions G on the color filter substrate 100. The color filter patterns 120 adopt a striped pattern design and cover the light shielding regions BM and the sub pixel regions G neighboring to the light shielding regions BM consecutively. A plurality of spacers PS is disposed on the color filter patterns 120 in the light shielding regions BM.

It should be noted that when disposing the color filter patterns 120 and the spacers PS, distances d1, d2 between the spacers PS and the color filter patterns 120, distances d3 between the spacers PS and the sub pixel regions G, and distances d4 between the two spacers PS should be considered. Thus, the first method has to consider the interconnection between different distances d1, d2, d3, d4, thereby resulting in a complicated design. Moreover, in order to dispose the spacers PS, a lot of space (such as the space required for the distances d3) is occupied in the horizontal direction.

FIG. 2 is a schematic top view of another conventional color filter substrate. Referring to FIG. 2, a color filter substrate 102 is similar to the color filter substrate 100, thus the same components are denoted with the same notations and the descriptions thereof are omitted hereinafter. In the color filter substrate 102, an island-shaped pattern design is adopted; that is, the color filter patterns 120 are only disposed on the sub pixel regions G. On the other hand, the spacers PS are directly disposed on the light shielding layer 110 in the light shielding regions BM.

Notably, when disposing the color filter patterns 120 and the spacers PS, a width D of each spacer PS, distances d5, d6 between the spacers PS and the color filter patterns 120, and distances d7, d8 between edges of the sub pixel regions G and the color filter patterns 120 should be taken into consideration. In the second method, the interconnection between different distances d5~d8 varies greatly so as to result in a complicated design. Additionally, in order to dispose the spacers PS, a lot of space (such as the space required for the distances d5, d6) is occupied in the horizontal direction.

FIG. 3 is a schematic top view of another conventional color filter substrate. Referring to FIG. 3, a color filter substrate 104 is similar to the color filter substrate 100, thus the same components are denoted with the same notations and the descriptions thereof are omitted hereinafter. In the color filter substrate 104, the color filter patterns 120 adopt a cavity design. Specifically, the color filter patterns 120 generally cover the light shielding regions BM and the sub pixel regions G neighboring to the light shielding regions BM consecutively. Especially, a portion of each color filter pattern 120 in each light shielding region BM is removed (excavating inwardly) to form a groove 122 respectively. On the other hand, the spacers PS are directly disposed in the grooves 122 respectively and disposed on the light shielding layer 110.

Notably, when disposing the color filter patterns 120 and the spacers PS, distances d9, d10 between edges of the spacers PS and edges of the grooves 122, and distances d11 between edges of the sub pixel regions G and the color filter patterns 120 should be taken into consideration. Consequently, the third method also requires the consideration of the interconnection between different distances d9~d11, thereby resulting in a complicated design. Furthermore, in order to dispose the spacers PS favorably, a lot of space (such as the space required for the distances d9) is occupied in the horizontal direction.

In light of the foregoing, the color filter substrates 100, 102, 104 occupy a lot of space in the horizontal direction, and this leads to low optical quality and an increase in material cost. As a result, the fabrication of a color filter substrate and an LCD panel with high resolution is unfavorable.

SUMMARY OF THE INVENTION

Accordingly, the invention is directed to a color filter substrate having superior resolution and fabrication stability.

The invention is further directed to a liquid crystal display (LCD) panel adopting the aforementioned color filter substrate to display an image with superior quality.

As aforementioned, the invention is directed to a color filter substrate disposed with a spacer. The color filter substrate includes a light shielding layer and a plurality of striped color filter patterns. The light shielding layer is disposed on a substrate. The light shielding layer defines a plurality of sub pixel regions and a plurality of light shielding regions on the substrate. The striped color filter patterns partially cover the light shielding regions and the sub pixel regions. Here, each striped color filter pattern includes a protrusion portion extending to the light shielding regions, and a part of each spacer is disposed above the protrusion portion.

The invention is further directed to an LCD panel including an active device array substrate, a color filter substrate, and a liquid crystal layer. The color filter substrate is disposed opposite to the active device array substrate. The color filter substrate or the active device array substrate is disposed with a spacer. The color filter substrate includes a light shielding layer and a plurality of striped color filter patterns. The light shielding layer is disposed on a substrate and defines a plurality of sub pixel regions and a plurality of light shielding regions on the substrate. The striped color filter patterns partially cover the light shielding regions and the sub pixel regions. Here, each striped color filter pattern includes a protrusion portion extending to the light shielding regions, and a part of each spacer is disposed above the protrusion portion. The liquid crystal layer is disposed between the active device array substrate and the color filter substrate.

According to one embodiment of the invention, the protrusion portion extends to the light shielding region between two adjacent striped color filter patterns.

According to one embodiment of the invention, a shape of the protrusion portion can be trapezoid shape, quadrilateral shape, polygonal shape, circular shape, or elliptical shape.

According to one embodiment of the invention, a distance between an edge of the spacer and an edge of the protrusion portion ranges from 5 micrometer (μm)~20 μm.

According to one embodiment of the invention, each striped color filter pattern further includes a recess portion disposed on an opposite side of the protrusion portion and having a shape identical to the shape of the protrusion portion.

According to one embodiment of the invention, the recess portion of each striped color filter pattern and the protrusion portion of a next striped color filter pattern are disposed conformally.

According to one embodiment of the invention, a distance between an edge of the recess portion and an edge of the protrusion portion ranges from 5 μm~15 μm.

According to one embodiment of the invention, a color of the striped color filter patterns includes red, green, or blue.

The invention adopts a design of semi-stripe color filter patterns; particularly, the striped color filter patterns each includes a protrusion portion extending to the light shielding regions, and a part of each spacer is disposed above the protrusion portion. Hence, each spacer is moved toward the light shielding region to release the space originally occupied by the spacer in the horizontal direction of the color filter patterns. As a consequence, under the same resolution, the space in the sub pixel regions is increased so as to enhance optical quality of the panel and save developmental cost of the module materials. Moreover, the spacers can be further supported by the protrusion portions to enhance the structural stability of the spacers.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
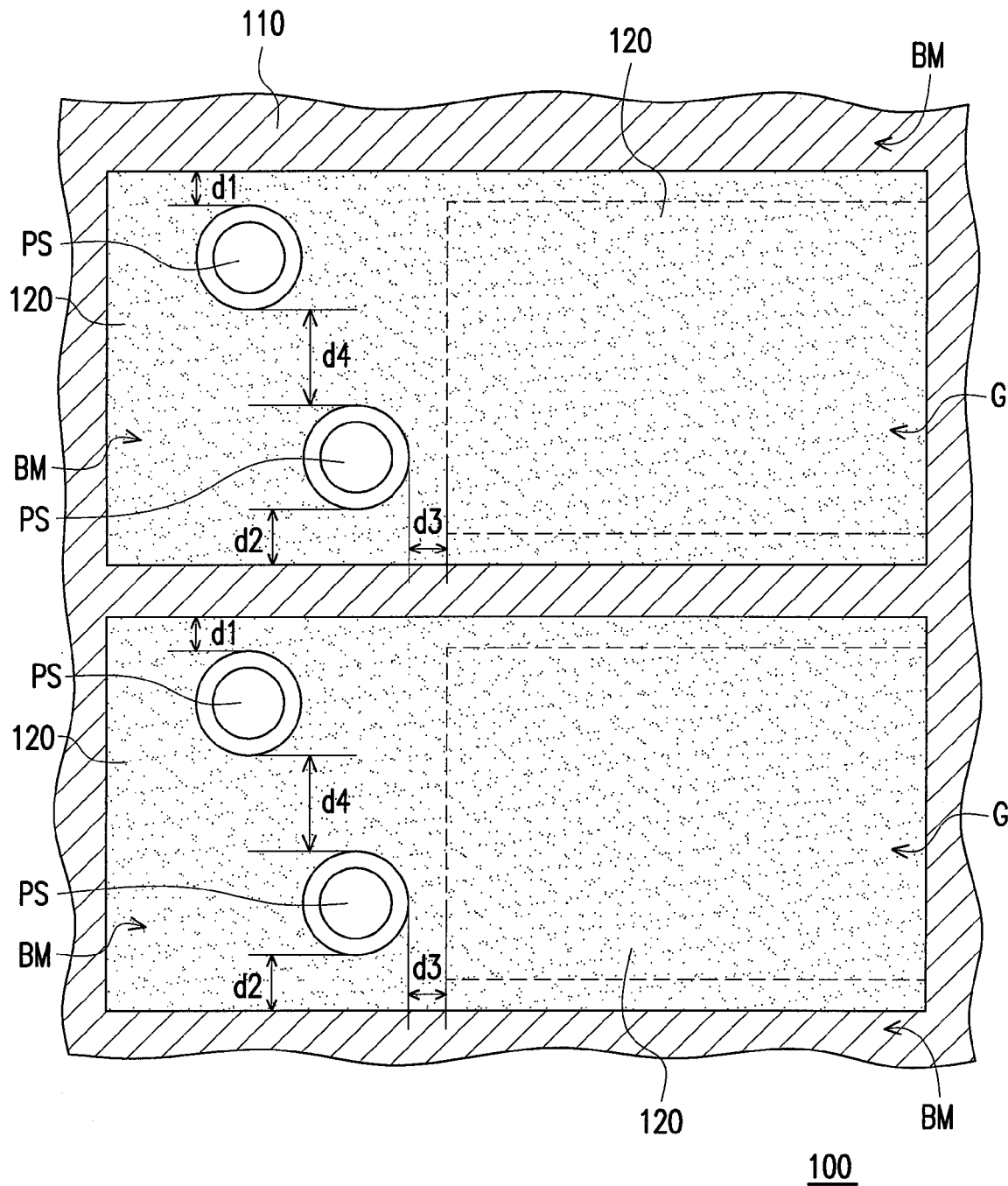
FIG. 1 is a schematic top view of a conventional color filter substrate.
Figure 2:
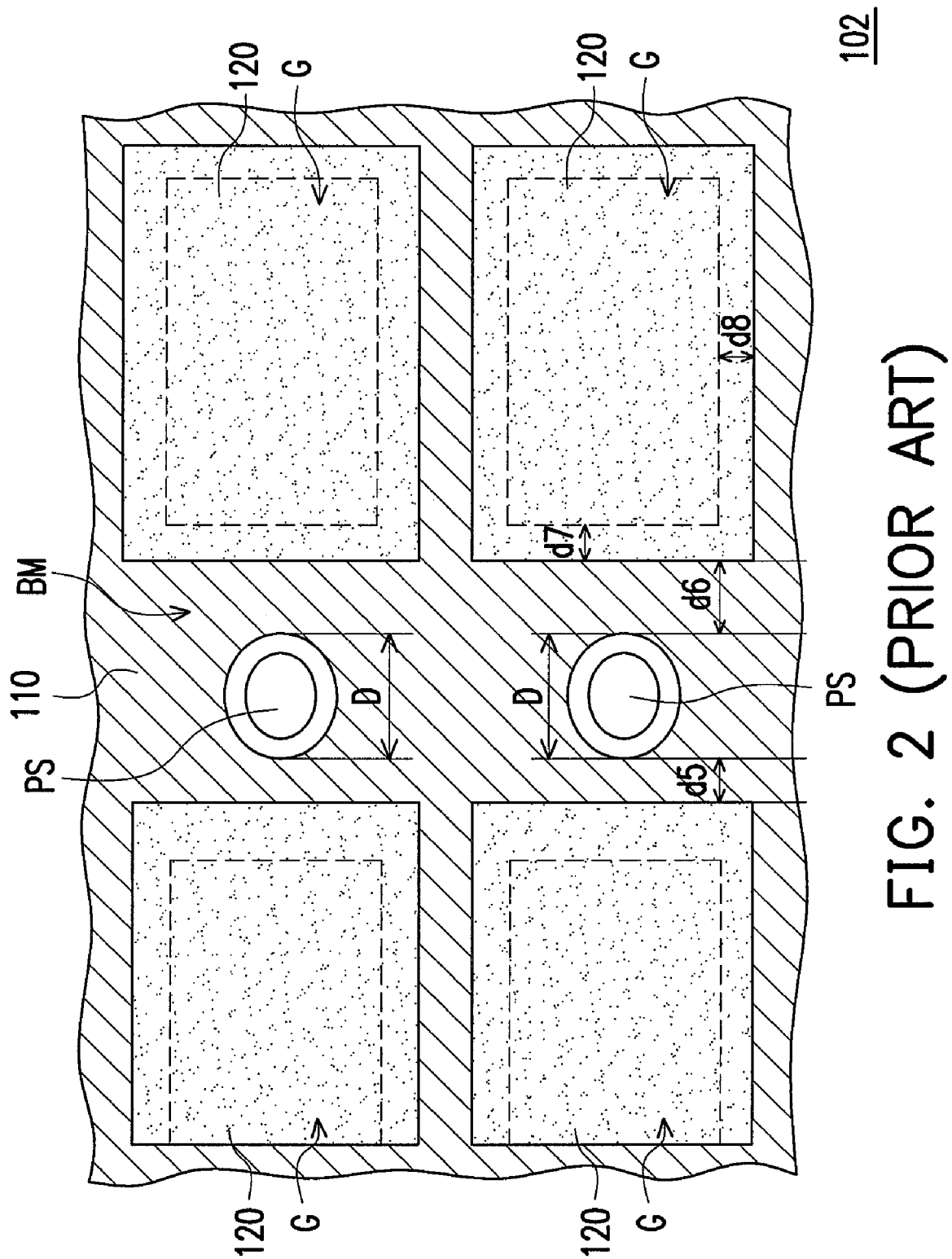
FIG. 2 is a schematic top view of another conventional color filter substrate.
Figure 3:
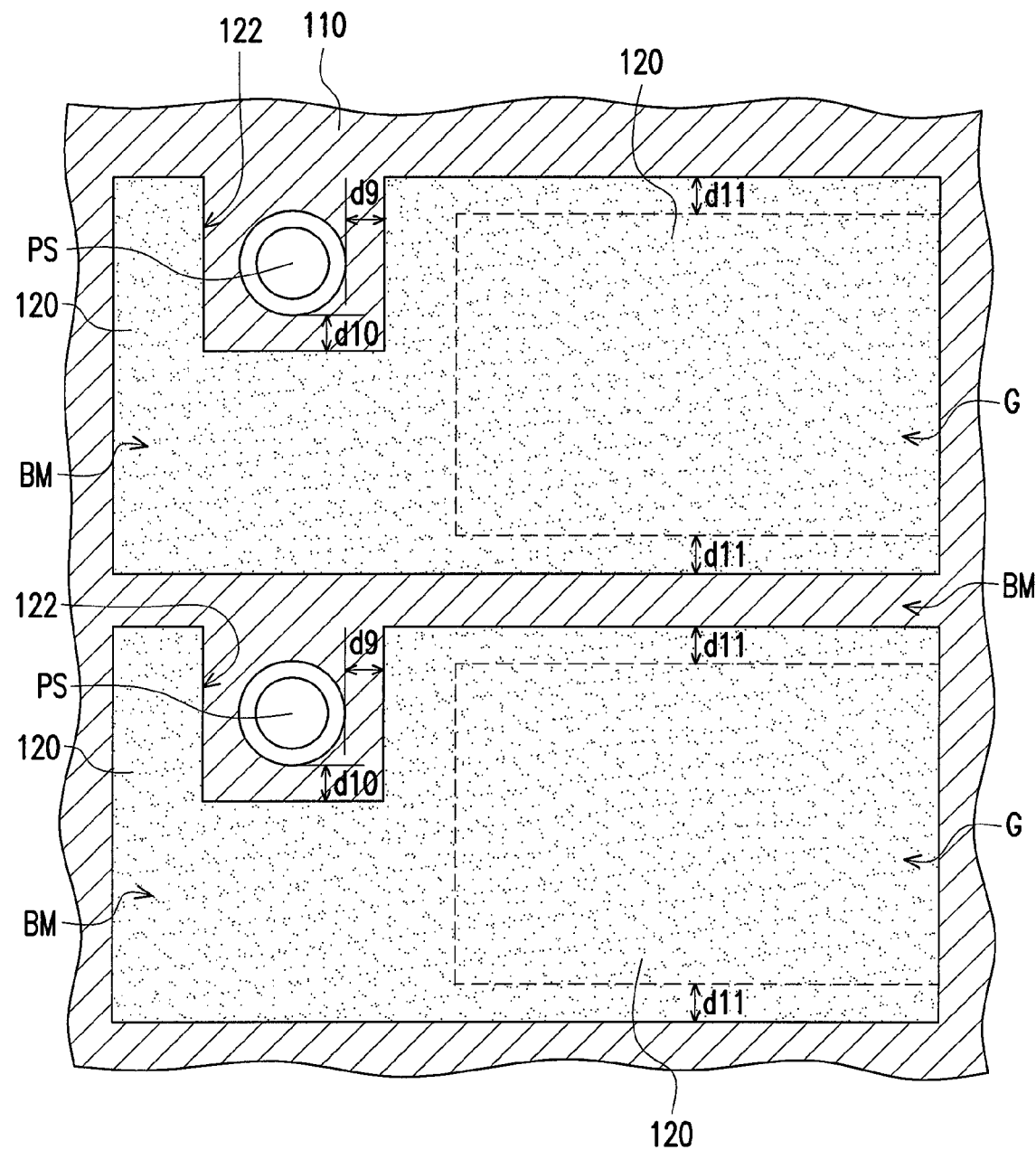
FIG. 3 is a schematic top view of another conventional color filter substrate.
Figure 4:
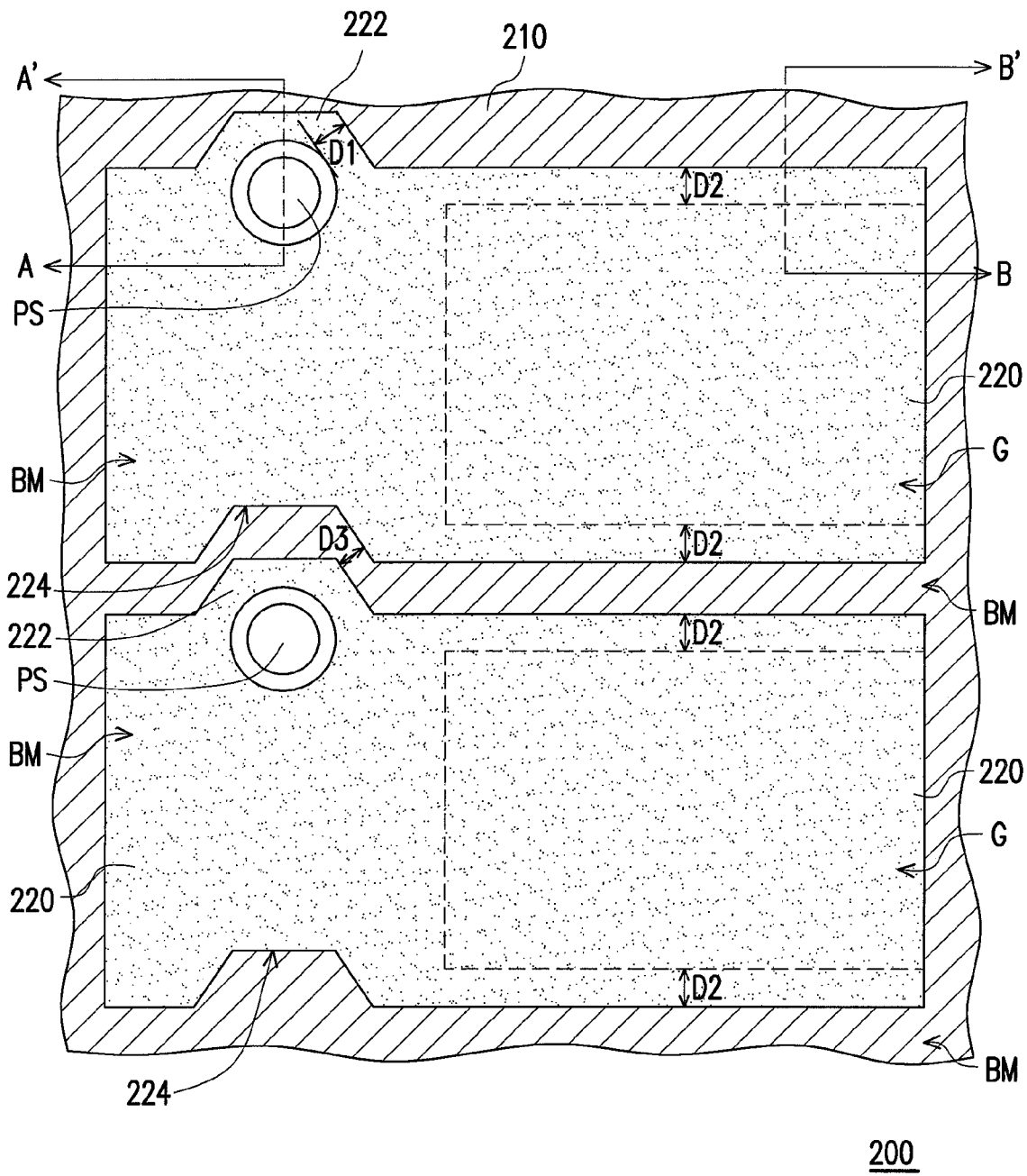
FIG. 4 is a schematic top view of a color filter substrate according to an embodiment of the invention.
Figure 5A:
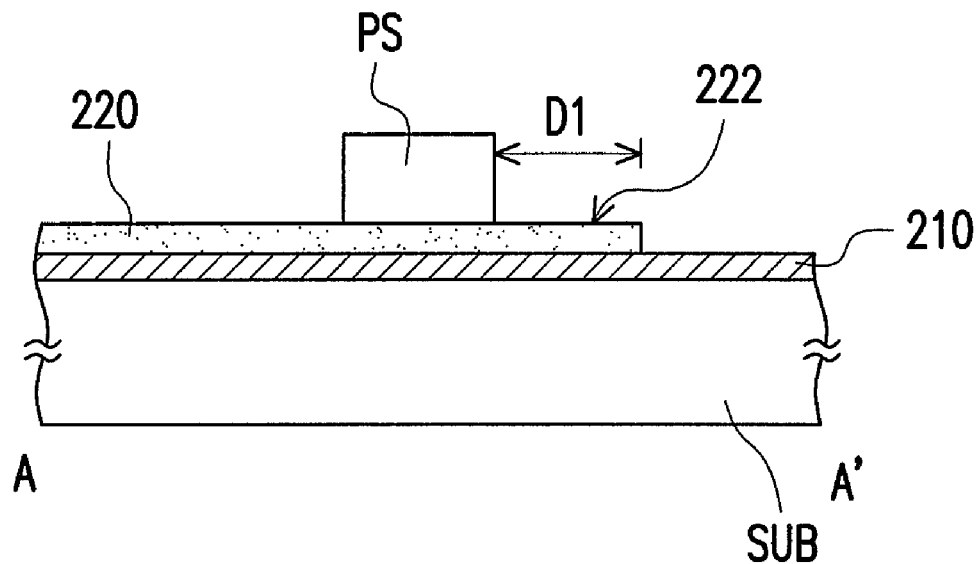
FIG. 5A is a schematic cross-sectional view taken along Line A-A' in FIG. 4.
Figure 5B:
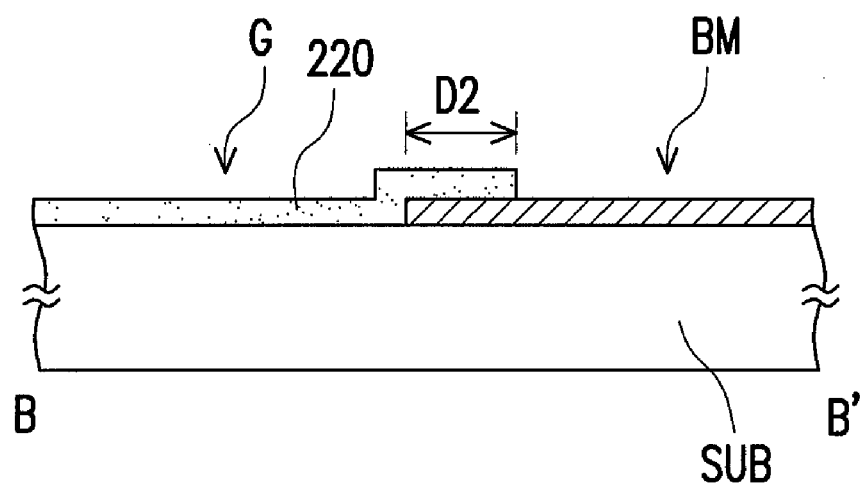
FIG. 5B is a schematic cross-sectional view taken along Line B-B' in FIG. 4.

FIG. 4 is a schematic top view of a color filter substrate according to an embodiment of the invention. FIG. 5A is a schematic cross-sectional view taken along Line A-A' in FIG. 4. FIG. 5B is a schematic cross-sectional view taken along Line B-B' in FIG. 4. Referring to FIGS. 4, 5A, and 5B simultaneously, a color filter substrate 200 is disposed with spacers PS. The color filter substrate 200 includes a light shielding layer 210 and a plurality of striped color filter patterns 220. The light shielding layer 210 is disposed on a substrate SUB. The light shielding layer 210 defines a plurality of sub pixel regions G and a plurality of light shielding regions BM on the substrate SUB. The color filter patterns 220 partially cover the light shielding layers BM and the sub pixel regions G. Each striped color filter pattern 220 includes a protrusion portion 222 extending to the light shielding region BM, and each spacer PS is disposed above each protrusion portion 222.

In FIG. 4, each striped color filter pattern 220 only has one protrusion portion. Practically, each striped color filter pattern 220 extends in the horizontal direction; thus, in different filter units (not shown), each striped color filter pattern 220 includes at least one protrusion portion 222. The invention does not limit the number and position of the protrusion portions 222. Moreover, each spacer PS is disposed above the corresponding protrusion portion 222 according to the design of the protrusion portions 222.

Referring to FIGS. 4 and 5A simultaneously, the protrusion portions 222 extend to the light shielding regions BM between the adjacent striped color filter patterns 220. In details, the striped color filter patterns 220 disposed below the spacers PS have protrusion portions 222, which occupy spaces of the light shielding regions BM between two adjacent striped color filter patterns 220. Accordingly, the spacers PS are moved toward the light shielding regions BM to release the space originally occupied by the spacers PS in the horizontal direction of the striped color filter patterns 220. The expansion space of the striped color filter patterns 220 is therefore increased in the horizontal direction. In other words, under the same resolution, the space in the sub pixel regions G is increased so as to enhance optical quality of the panel and save developmental cost of the module materials.

In particular, the protrusion portions 222 provide the space for disposing the spacers PS; that is, the spacers PS are well supported on the protrusion portions 222. Thus, the structure and fabrication stability of the spacers PS can be enhanced. In other words, the spacers PS do not tilt even when being moved toward the light shielding regions BM.

As shown in FIG. 4, a distance D1 between an edge of each spacer PS and an edge of each protrusion portion 222 preferably ranges from 5 μm~20 μm. By setting a suitable distance D1, not only is the space occupied by each spacer PS released in the horizontal direction of the striped color filter patterns 220, but the stability of disposing the spacers PS on the striped color filter patterns 220 is also enhanced.

Referring to FIGS. 4 and 5B simultaneously, each striped color filter pattern 220 covers edges of a part of each sub pixel region G, and a distance D2 between an edge of each striped color filter pattern 220 and an edge of each sub pixel region G ranges preferably from 5 μm~15 μm. Therefore, the color filter patterns 220 are disposed on the sub pixel regions G favorably.

Referring to FIG. 4, each striped color filter pattern 220 further includes a recess portion 224 disposed on an opposite side of each protrusion portion 222 and having a shape identical to the shape of the protrusion portion 222. Especially, the recess portion 224 of each striped color filter pattern 220 and the protrusion portion 222 of a next striped color filter pattern 220 are disposed conformally, and the protrusion portion 222 can thus be embedded in the space released by the recess portion 224. Moreover, a distance D3 between an edge of each recess portion 224 and an edge of each protrusion portion 222 preferably ranges from 5 μm~15 μm. As a result, each striped color filter pattern 220 is aligned in a favorable manner.

Referring to FIG. 4, a color of the striped color filter patterns 220 is red, green, or blue. The striped color filter patterns 220 can be aligned in a sequence of red, green, and blue repeatedly. However, the color and alignment manner of the striped color filter patterns 220 are not limited in the invention and are depending on design requirements.

Figure 6:
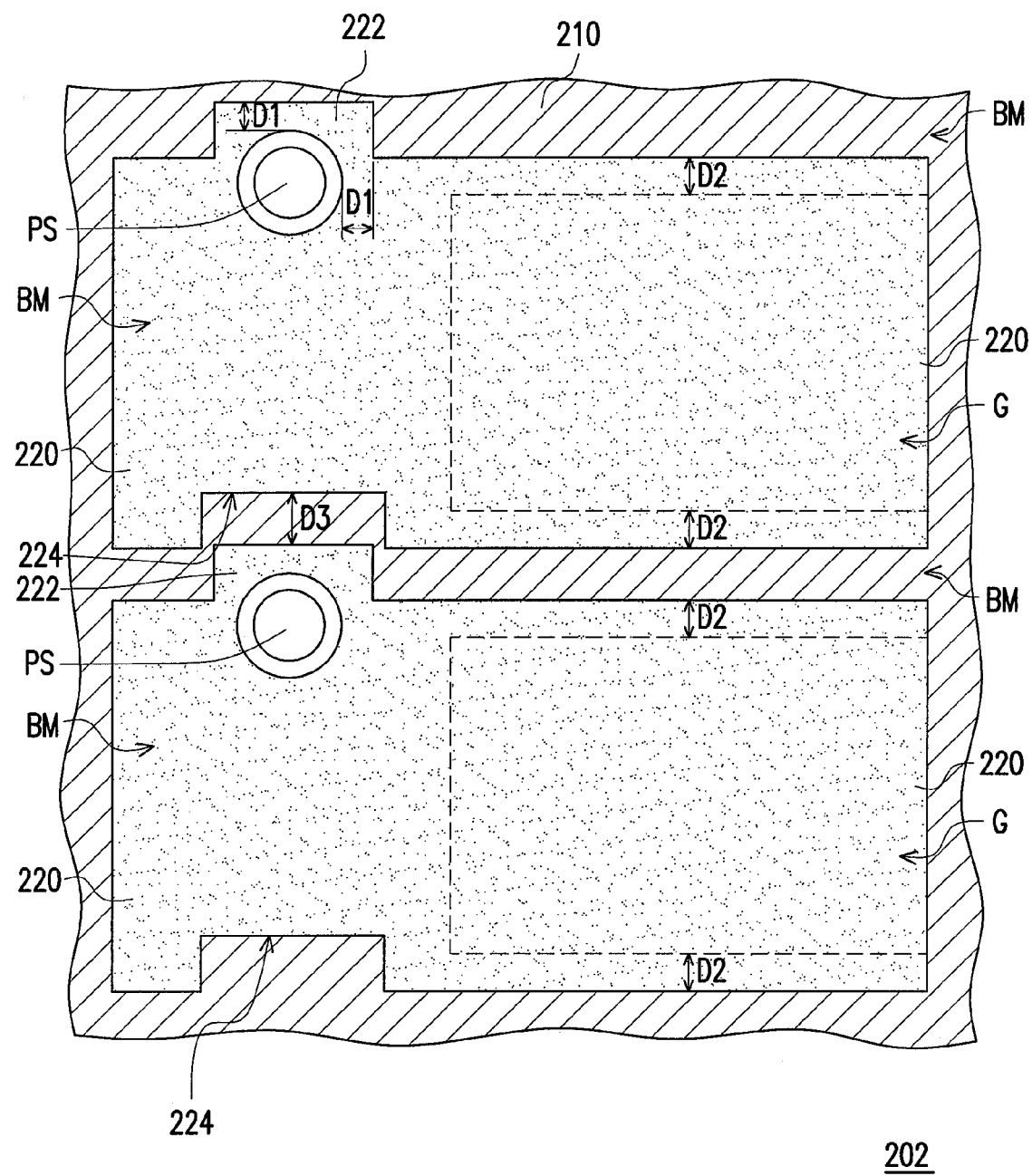
FIG. 6 is a schematic top view of another color filter substrate according to an embodiment of the invention.

FIG. 6 is a schematic top view of another color filter substrate according to an embodiment of the invention. Referring to FIG. 6, a color filter substrate 202 is similar to the color filter substrate 200 shown in FIG. 4, thus the same components are denoted with the same notations and the descriptions thereof are omitted hereinafter.

It should be illustrated that the protrusion portions 222 shown in FIG. 5 each has a shape of a trapezoid, and the protrusion portions 222 shown in FIG. 6 each has a shape of a quadriangle. The shape of the protrusion portions 222 can be designed in accordance with design requirements; that is, the shape of the protrusion portions 222 includes a trapezoid shape, a quadrilateral shape, a polygonal shape, a circular shape, an elliptical shape, or any desirable shape.

As mentioned above, in the color filter substrates 200, 202, the protrusion portions 222 are disposed below the spacers PS, where the protrusion portions 222 extend from the striped color filter patterns 220. As the protrusion portions 222 utilize the space in the light shielding regions BM between two adjacent striped color filter patterns 220, the space in the horizontal direction is not occupied when disposing the spacers PS. Therefore, under the same resolution, the space in the sub pixel regions is increased so as to enhance optical quality of the panel and save developmental cost of the module materials.

Figure 7:
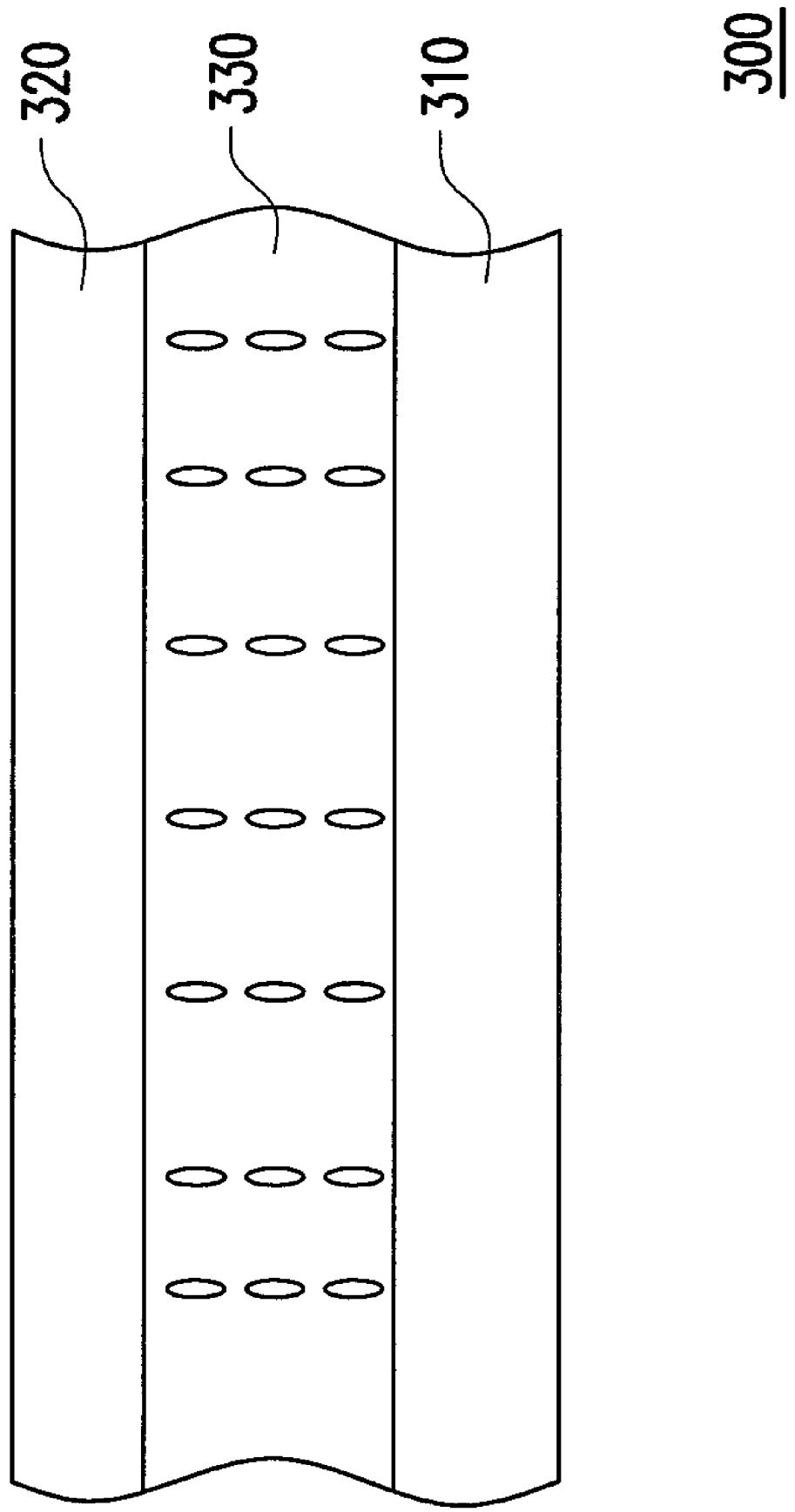
FIG. 7 is a schematic view illustrating a liquid crystal display panel according to an embodiment of the invention.

FIG. 7 is a schematic view illustrating an LCD panel according to an embodiment of the invention. Referring to FIG. 7, an LCD panel 300 includes an active device array substrate 310, a color filter substrate 320 and a liquid crystal layer 330. The color filter substrate 320 is disposed opposite to the active device array substrate 310. The color filter substrate 320 or the active device array substrate 310 is disposed with spacers (not shown). This color filter substrate 320 can be the color filter substrate 200 or 202 depicted in FIG. 4 or FIG. 6, and the descriptions thereof are thus omitted herein. The liquid crystal layer 330 is disposed between the active device array substrate 310 and the color filter substrate 320.

Particularly, as illustrated in FIG. 4 or FIG. 6, the spacers PS are disposed above the protrusion portions 222. The spacers PS are directly disposed on the protrusion portions 222 of the striped color filter patterns 220; or, the spacers PS are disposed on the opposite active device array substrate 310, so that the spacers PS lean against adjacent active devices (not shown). Since the LCD panel 300 adopts the color filter substrates 200, 202 which have high resolution, the image display quality of the LCD 300 is enhanced.

In summary, the color filter substrate and the LCD panel of the invention has at least the following advantages.

The semi-stripe design for the color filter patterns is adopted, such that the color filter patterns include the protrusion portions extending to the light shielding regions. Moreover, a part of each spacer is disposed above each protrusion portion. Accordingly, each spacer is moved toward the light shielding region so as to release the space originally occupied by the spacer in the horizontal direction of the color filter patterns. As a result, under the same resolution, the space in the sub pixel regions is increased so as to enhance optical quality of the panel and save developmental cost of the module materials. Furthermore, the spacers can be further supported by the protrusion portions to enhance the structural stability of the spacers.

Although the invention has been described with reference to the embodiments thereof, it will be apparent to one of the ordinary skills in the art that modifications to the described embodiments may be made without departing from the spirit of the invention. Accordingly, the scope of the invention will be defined by the attached claims not by the above detailed description.

What is claimed is:

1. A color filter substrate disposed with a spacer, the color filter substrate comprising:
    a light shielding layer, disposed on a substrate and defining a plurality of sub pixel regions and a plurality of light shielding regions on the substrate; and
    a plurality of striped color filter patterns, partially covering the light shielding regions and the sub pixel regions, wherein each striped color filter pattern comprises a recess portion, a linear portion passing through corresponding sub pixel regions and a protrusion portion extending from the linear portion to the light shielding regions such that the each color filter pattern has a zigzag margin, a part of the spacer is disposed above the protrusion portion, and the recess portion is disposed on an opposite side of the protrusion portion and has a shape identical to the shape of the protrusion portion.

2. The color filter substrate as claimed in claim 1, wherein the protrusion portion extends to the light shielding region between two adjacent striped color filter patterns.

3. The color filter substrate as claimed in claim 1, wherein a shape of the protrusion portion comprises a trapezoid shape, a quadrilateral shape, a polygonal shape, a circular shape, or an elliptical shape.

4. The color filter substrate as claimed in claim 1, wherein a distance between an edge of the spacer and an edge of the protrusion portion ranges from 5 micrometer (μm)~20 μm.

5. The color filter substrate as claimed in claim 1, wherein the recess portion of each striped color filter pattern and the protrusion portion of a next striped color filter pattern are disposed conformally.

6. The color filter substrate as claimed in claim 5, wherein a distance between an edge of the recess portion and an edge of the protrusion portion ranges from 5μm~15 μm.

7. The color filter substrate as claimed in claim 1, wherein a color of the striped color filter patterns comprises red, green, or blue.

8. A liquid crystal display panel, comprising:
    an active device array substrate;
    a color filter substrate, disposed opposite to the active device array substrate and a spacer is disposed on the color filter substrate or the active device array substrate, the color filter substrate comprising:
        a light shielding layer, disposed on a substrate and defining a plurality of sub pixel regions and a plurality of light shielding regions on the substrate;
    a plurality of striped color filter patterns, partially covering the light shielding regions and the sub pixel regions, wherein each striped color filter pattern comprises a recess portion, a linear portion passing through corresponding sub pixel regions and a protrusion portion extending from the linear portion to the light shielding regions such that the each color filter pattern has a zigzag margin, a part of the spacer is disposed above the protrusion portion, and the recess portion is disposed on an opposite side of the protrusion portion and has a shape identical to the shape of the protrusion portion; and a liquid crystal layer, disposed between the active device array substrate and the color filter substrate.

9. The liquid crystal display panel as claimed in claim 8, wherein the protrusion portion extends to the light shielding layer between two adjacent striped color filter patterns.

10. The liquid crystal display panel as claimed in claim 8, wherein a shape of the protrusion portion comprises a trapezoid shape, a quadrilateral shape, a polygonal shape, a circular shape, or an elliptical shape.

11. The liquid crystal display panel as claimed in claim 8, wherein a distance between an edge of the spacer and an edge of the protrusion portion ranges from 5μm~20 μm.

12. The liquid crystal display panel as claimed in claim 8, wherein the recess portion of each striped color filter pattern and the protrusion portion of a next striped color filter pattern are disposed conformally.

13. The liquid crystal display panel as claimed in claim 12, wherein a distance between an edge of the recess portion and an edge of the protrusion portion ranges from 5μm~20 μm.

14. The liquid crystal display panel as claimed in claim 8, wherein a color of the striped color filter patterns comprises red, green, or blue.

* * * * *